(12) United States Patent
Breigenzer (10) Patent No.: US 10,604,271 B2
(45) Date of Patent: Mar. 31, 2020

(54) SECONDARY FLIGHT DECK DOOR PRIVACY/BARRIER PANEL SYSTEM

(71) Applicant: THE BOEING COMPANY, Chicago, IL (US)

(72) Inventor: Thomas James Breigenzer, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 566 days.

(21) Appl. No.: 15/461,678

(22) Filed: Mar. 17, 2017

(65) Prior Publication Data

US 2018/0265216 A1 Sep. 20, 2018

(51) Int. Cl.
  *B64D 45/00* (2006.01)
  *B64C 1/14* (2006.01)
  *E05B 81/56* (2014.01)
  *E05B 81/70* (2014.01)
  *E06B 9/24* (2006.01)

(52) U.S. Cl.
  CPC ........ *B64D 45/0015* (2013.01); *B64C 1/1469* (2013.01); *E05B 81/56* (2013.01); *E05B 81/70* (2013.01); *E06B 2009/2464* (2013.01)

(58) Field of Classification Search
  CPC .... B64D 45/0015; B64C 1/1469; E05B 81/70
  USPC ......................................................... 340/5.7
  See application file for complete search history.

(56) References Cited

U.S. PATENT DOCUMENTS

| 7,578,477 | B2 * | 8/2009 | French | B64C 1/1469 |
| | | | | 244/117 R |
| 2005/0116098 | A1 * | 6/2005 | Martens | B64C 1/1469 |
| | | | | 244/118.5 |
| 2014/0158826 | A1 * | 6/2014 | Young | B64D 11/02 |
| | | | | 244/118.5 |

OTHER PUBLICATIONS

"Programmable Logic Contollers", Chapter 6—Ladder Logic, https://www.allaboutcircuits.com/textbook/digital/chpt-6/programmable-logic-controllers-plc/,accessed Mar. 2, 2017.
Title 14—Chapter 1—Subchapter G—Part 121—Subpart T—§121.584, Electronic Code of Federal Regulations, current as of Feb. 28, 2017.
White Paper: "Secondary Flight Deck Barriers and Flight Deck Access Procedures—A Call for Action", Air Line Pilots Association International, Washington, D.C., Mar. 2013.

* cited by examiner

*Primary Examiner* — Vernal U Brown
(74) *Attorney, Agent, or Firm* — Patterson + Sheridan, LLP (57) ABSTRACT

An aircraft and system of doors for providing security to a flight deck of the aircraft, and methods for operating the same, are provided. A passenger cabin is separated from a flight deck by an aisle that includes doors at either end. The doors are locked by a controller and one of the doors may only be unlocked, during a flight, if the remaining door is locked. As a result, a pilot can access a lavatory in the aisle in a secure manner. Additionally, the door closest to the passenger cabin may include a window that allows the pilots to view the passenger cabin through a peephole in the flight deck door. The controller may selectively dim or block a view through the window to prevent monitoring of the pilots' movements onto and off of the flight deck.

20 Claims, 8 Drawing Sheets

SECONDARY FLIGHT DECK DOOR PRIVACY/BARRIER PANEL SYSTEM

BACKGROUND

The aspects described herein relate to aircraft security, and more specifically, to controlling operation of multiple doors that provide access to a flight deck of an aircraft.

Flight deck doors on commercial aircraft are lockable and reinforced to prevent hijackers, terrorists, or other individuals with nefarious intent from gaining access to the flight deck and taking control of the aircraft. On longer flights, it is sometimes necessary for the flight deck door to be opened. For example, a pilot may need to leave the flight deck to use the restroom or one pilot may leave the flight deck and be replaced by a relief pilot. In another example, a flight attendant may bring meals and/or drinks to the pilots on the flight deck. When the flight deck door is to be unlocked and opened, a flight attendant will often block the door with a galley cart (e.g., a beverage cart) to prevent unauthorized persons from accessing the open and/or unlocked flight deck door.

SUMMARY

According to one aspect, an aircraft comprises a passenger cabin, a flight deck, and an aisle disposed between the passenger cabin and the flight deck. The aisle includes a first doorway connected to the passenger cabin at a first end and a second doorway connected to the flight deck at an opposing second end. The aircraft also comprises a flight crew facility disposed between the first end and the second end of the aisle. The flight crew facility includes a third doorway connected to the aisle. The aircraft also includes a first door disposed in the first doorway. The first door is movable between an open position and a closed position. The first door is selectively switchable between an unlocked state and a locked state when the first door is in the closed position. The aircraft also comprises a second door disposed in the second doorway. The second door is movable between an open position and a closed position. The second door is selectively switchable between an unlocked state and a locked state when the second door is in the closed position. The aircraft also comprises a third door disposed in the third doorway. The third door is movable between an open position and a closed position. The third door is selectively switchable between an unlocked state and a locked state when the third door is in the closed position. The aircraft also comprises a controller operable to control switching of the first and second doors between the respective unlocked states and the locked states. The controller switches a first one of the first and second doors from the locked state to the unlocked state, while the aircraft is operating, upon receiving a request signal to unlock the one of the first and second doors, and a remaining one of the first and second doors being in the locked state.

According to one aspect, a system comprises a first electronically-actuated lock configured to be disposed relative to a first door in a first doorway at a first end of an aisle. The system also includes a second electronically-actuated lock configured to be disposed relative to a second door in a second doorway at an opposing second end of the aisle. The system also includes an electronically-controllable window configured to be disposed in the second door that is switchable between a transparent state and an opaque state. The system also includes a controller in electronic communication with the first electronically-actuated lock, the second electronically-actuated lock, and the electronically-controllable window. The controller is operable to transmit first signals to the first electronically-actuated lock. The first signals switch the first electronically-actuated lock between a locked state and an unlocked state. The controller is also operable to transmit second signals to the second electronically-actuated lock. The second signals switch the second electronically-actuated lock between a locked state and an unlocked state. The controller is also operable to transmit third signals to the electronically-controllable window. The third signals switch the electronically-controllable window between the transparent state and the opaque state. The controller transmits the first signals to switch the first electronically-actuated lock to the unlocked state upon determining that the second electronically-actuated lock is in the locked state and transmitting the third signals to the electronically-controllable window to switch the electronically-controllable window to the opaque state. The controller transmits the second signals to switch the second electronically-actuated lock to the unlocked state upon determining that the first electronically-actuated lock is in the locked state.

According to one aspect, a computer-implemented method comprises transmitting a first signal to a first electronic lock to lock a first door in a first doorway at a first end of an aisle. The method also comprises transmitting a second signal to a second electronic lock to lock a second door in a second doorway at an opposing second end of the aisle. The second door includes an electronically-controllable window that is switchable between a transparent state and an opaque state, based on a third signal. The method also comprises unlocking the first door upon receiving an unlock command, transmitting the third signal to switch the electronically-controllable window from the transparent state to the opaque state, and receiving an indication that the second door is locked. The method also comprises unlocking the second door upon receiving a second unlock command and upon receiving an indication that the first door is locked.

BRIEF DESCRIPTION OF ILLUSTRATIONS

DETAILED DESCRIPTION

In aspects described herein, an aircraft is provided with a second door between a passenger cabin and a flight deck. The second door can be closed at least when the flight deck door is to be opened, providing additional security for the flight deck and the flight crew. Flight crew facilities, such as a lavatory and/or a flight crew rest area, are accessible in an aisle disposed between the flight deck door and the second door. As a result, the flight crew can move between the flight deck and the flight crew facilities while still having a secured door separating them from the passenger cabin.

Figure 1:
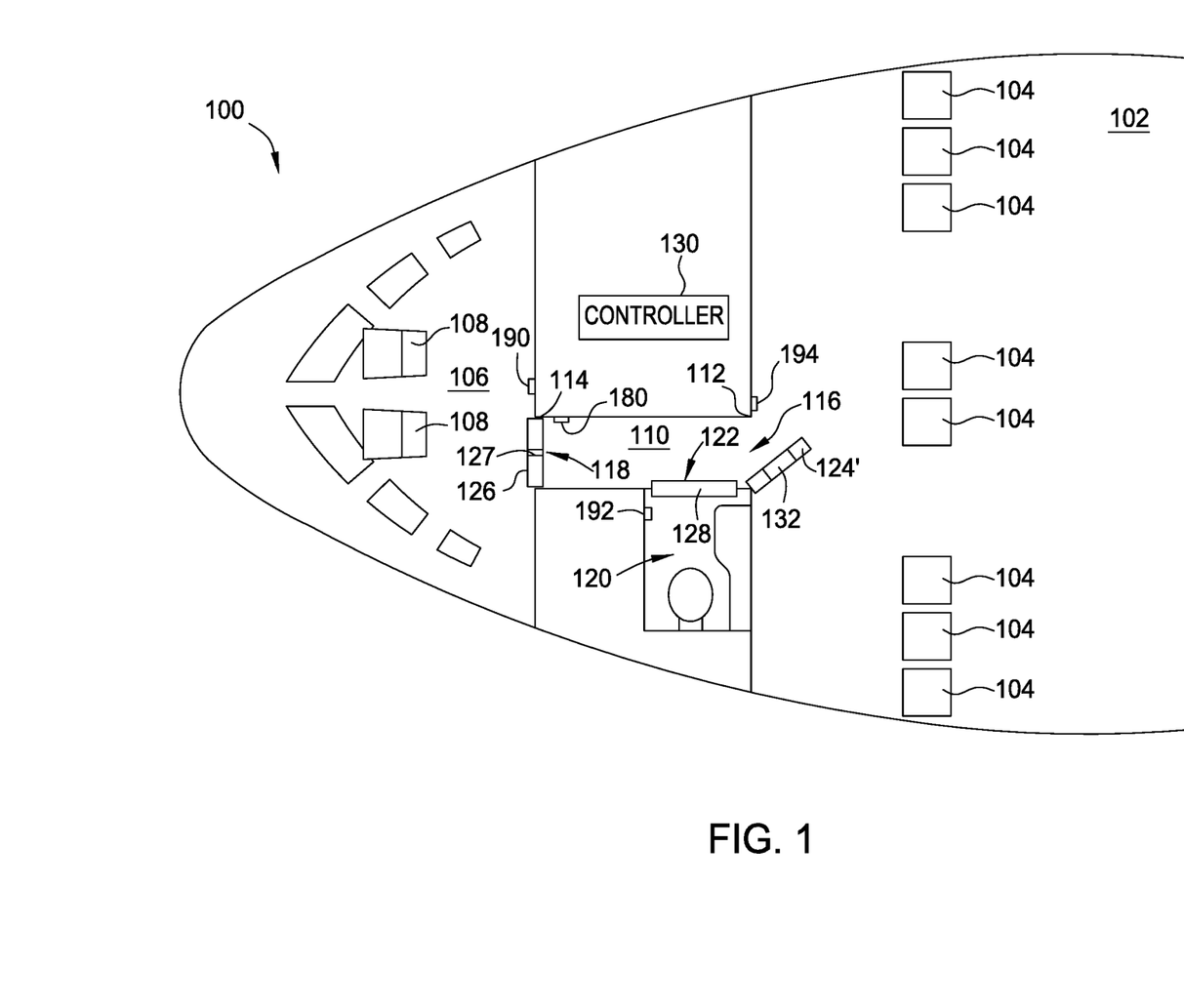
FIG. 1 is a top schematic view of a layout of a forward portion of an aircraft according to one aspect, wherein an aisle door is open and doors to a flight deck and to a lavatory are closed.

FIG. 1 is a top view of a forward portion of an aircraft 100 that includes a passenger cabin 102 and a flight deck 106. The passenger cabin 102 includes a plurality of passenger seats 104. The flight deck 106 includes seats 108 for the pilot and the copilot. An aisle 110 is disposed between the passenger cabin 102 and the flight deck 106. The aisle 110 includes a first doorway 116 connected to the passenger cabin 102 at a first end 112 and a second doorway 118 connected to the flight deck 106 at an opposing second end 114. A flight crew facility 120 is disposed between the first end 112 and the second end 114 of the aisle 110. The flight crew facility 120 is connected to the aisle 110 by a third doorway 122. In the illustrated aspect, the flight crew facility 120 is a lavatory. In various other aspects, the flight crew facility 120 could be a flight crew rest area (e.g., bunks for off-duty crew members). In various other aspects, the aisle 110 could be connected to multiple flight crew facilities, such as a first flight crew facility that is a lavatory and a second flight crew facility that is a flight crew rest area.

The aircraft 100 includes an aisle door 124 (i.e., a first door) disposed in the first doorway 116 that is movable between an open position and a closed position. In FIG. 1, the aisle door 124 is shown in an open position. The aircraft 100 also includes a flight deck door 126 (i.e., a second door) disposed in the second doorway 118 that is movable between an open position and a closed position. In FIG. 1, the flight deck door 126 is shown in the closed position. The aircraft 100 also includes a flight crew facility door 128 (i.e., a third door) disposed in the third doorway 122 that is movable between an open position and a closed position. In FIG. 1, the flight crew facility door 128 is shown in the closed position. A "prime" symbol is added herein to the reference numerals 124, 126, and 128 for the doors when the doors are in the respective open positions. Thus, in FIG. 1, the aisle door 124, which is illustrated in an open position, is referenced using reference numeral 124'. The aisle door 124', the flight deck door 126, and the flight crew facility door 128 are switchable between locked states and unlocked states. With respect to the aisle door 124' and the flight deck door 126, the locks are electronically controllable by a controller 130. For example, the locks for the aisle door 124' and the flight deck door 126 may be deadbolts arranged in the doorways 116 and 118 that are extended and retracted using solenoids. The flight crew facility door 128 is also lockable. In at least one aspect, the flight crew facility door 128 is manually lockable by a flight crew member who enters the flight crew facility 120. For example, the lock for the flight crew facility door 128 could be a bolt that the flight crew member manually slides to engage the doorway 122. In at least one other aspect, the lock for the flight crew facility door 128 is electronically controllable by the controller 130 (e.g., a deadbolt that is extended and retracted using a solenoid).

In at least one aspect, the aisle door 124 includes an electronically-controllable window 132 disposed therein. The window 132 in the aisle door 124 may be aligned with a viewing axis of a peephole 127 disposed in the flight deck door 126. That is, when the aisle door 124 and flight deck door 126 are both closed, they are in a parallel, facing relationship that defines an optical pathway from the flight deck 106 into the passenger cabin 102 via the peephole 127 and window 132. The optical pathway allows a pilot or other flight crew member on the flight deck 106 to look through the peephole 127 and visually observe the aisle 110 and as well as the passenger cabin 102 (through the window 132). Conversely, the window 132 also allows flight attendants or other personnel (e.g., federal air marshals) to view the flight deck door 126 from the passenger cabin. Optionally, the window 132 may be selectively shaded or otherwise blocked. In one aspect, the window 132 is electrically switchable between a transparent state and an opaque state, e.g., using electrochromic glass. The window 132 may be in communication with the controller 130, and the controller 130 controls switching between the transparent state and the opaque state. In another aspect, the window 132 may include a mechanical shade that is selectively movable over the window 132 to block viewing there through. As described in greater detail below, the window 132 may be shaded or blocked when flight crew members are in transit between the flight deck 106, the aisle 110, and the flight crew facility 120 such that passengers in the passenger cabin 102 cannot track movement of the flight crew members.

Figure 2:
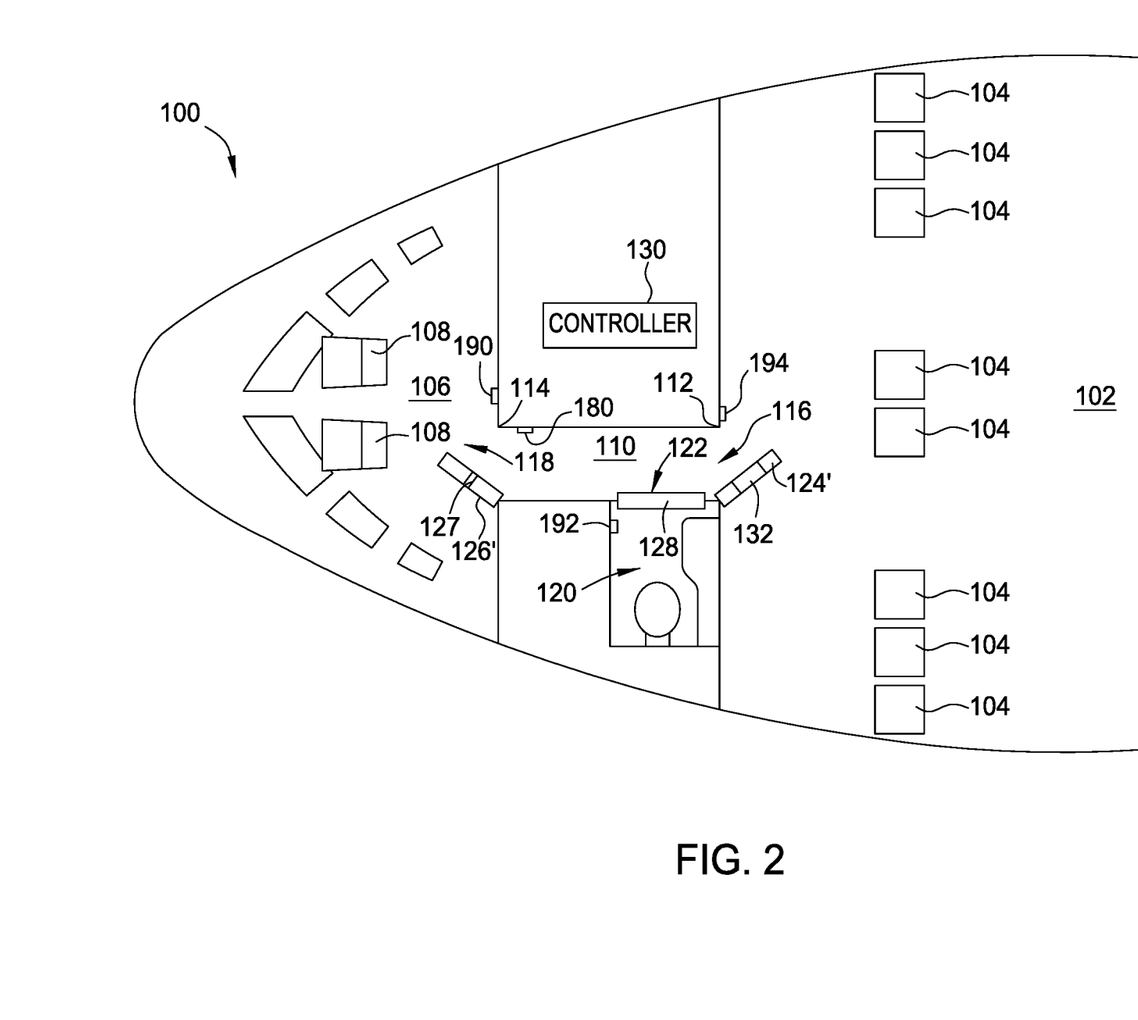
FIG. 2 is a top schematic view of the layout shown in FIG. 1, wherein the aisle door and the flight deck door are open and the door to the lavatory is closed.

Procedures for opening, closing, and locking the aisle door 124, the flight deck door 126, and the flight crew facility door 128 during various stages of aircraft operation during a flight will be described with reference to FIGS. 1-6. FIG. 1 illustrates a pre-flight stage of the aircraft 100 prior to anyone boarding the aircraft 100. Here, the flight deck door 126 to the flight deck 106 and the flight crew facility door 128 to the flight crew facility 120 are closed but not locked. The aisle door 124' is in the open position. FIG. 2 illustrates a "boarding" stage of the aircraft 100 after the flight crew has boarded the aircraft 100 and/or during passenger boarding of the aircraft 100. In the "boarding" stage, the flight deck door 126' to the flight deck is in the open position and the aisle door 124' is also in the open position.

Referring back to FIG. 1, after the boarding stage is complete, the flight deck door 126 to the flight deck 106 is closed and locked during a closing stage. The controller 130 transmits a signal to the electronic lock associated with the flight deck door 126 to lock the flight deck door 126. The controller 130 may receive indications from one or more sources to determine that the aircraft 100 is in the closing stage. For example, the controller 130 may receive a signal from the aircraft 100 that the exterior doors to the passenger cabin 102 have been closed and locked. As another example, the controller 130 may receive a signal that the aircraft 100 has pushed back from the gate. As yet another example, the controller 130 may receive a signal that one or more of the engines for the aircraft 100 have been started. Once the controller 130 receives an indication that the aircraft is in the closing stage, the controller 130 transmits the signal to the electronic lock associated with the flight deck door 126 to lock the flight deck door 126. In the event the flight deck door 126 has not been moved to the closed position, the controller 130 may delay transmitting the signal to the electronic lock associated with the flight deck door 126 until the flight deck door 126 is closed. Furthermore, the controller 130 may transmit an alert to the flight crew on the flight deck 106, notifying the flight crew to close the flight deck door 126. For example, in one aspect, the controller 130 may transmit a message to an engine indicating in crew alerting system (EICAS) display screen on the flight deck 106, indicating that the flight deck door 126 is not closed.

After the closing stage, the aircraft 100 is in a "nominal" stage, which represents normal operations such as taxi, takeoff, climb, cruise, descent, and landing. The controller 130 may receive indications from one or more sources to determine that the aircraft is in the "nominal" stage. For example, the controller 130 may receive a signal that all engines have started and/or that the aircraft 100 is taxiing under its own power (i.e., not being pushed by a tug). Once the controller 130 receives an indication of the aircraft 100 is in the "nominal" stage, the controller 130 transmits a signal to the electronic lock associated with the aisle door 124 to lock the aisle door 124. In the event the aisle door 124 has not been moved to the closed position, the controller 130 may delay transmitting the signal to the electronic lock associated with the aisle door 124 until the aisle door 124 is closed. Furthermore, the controller 130 may transmit one or more alerts to the flight crew on the flight deck 106 and/or the flight attendants in the passenger cabin 102 notifying the flight crew and/or flight attendance to close the aisle door 124. For example, the controller 130 may transmit a message to the EICAS display screen on the flight deck 106 and/or to a status panel in the passenger cabin, indicating that the aisle door 124 is not closed. In aspects in which the aisle door 124 includes the window 132 that is switchable between a transparent state and an opaque state, the controller 130 maintains the window 132 in the transparent state in the "nominal" stage such that the flight attendants and/or other personnel in the passenger cabin 102 can view the aisle 110 and the flight deck door 126 there-through.

In the event the flight for the aircraft is short enough that the flight crew on the flight deck 106 does not have to leave the flight deck 106, the controller 130 maintains the aisle door 124 and the flight deck door 126 in the locked states throughout the flight. After landing (e.g., after the aircraft has parked at a gate and shut down the engines), the aisle door 124 can be unlocked (by the controller 130) and opened (as shown in FIG. 1). Thereafter, the flight deck door 126 can be unlocked (by the controller 130) and opened. After the flight crew members depart the flight deck 106, the flight deck door 126 can be closed. Optionally, the controller 130 may lock the flight deck door 126 when the flight deck 106 is unoccupied to prevent unauthorized manipulation of the aircraft controls and/or systems.

Figure 4:
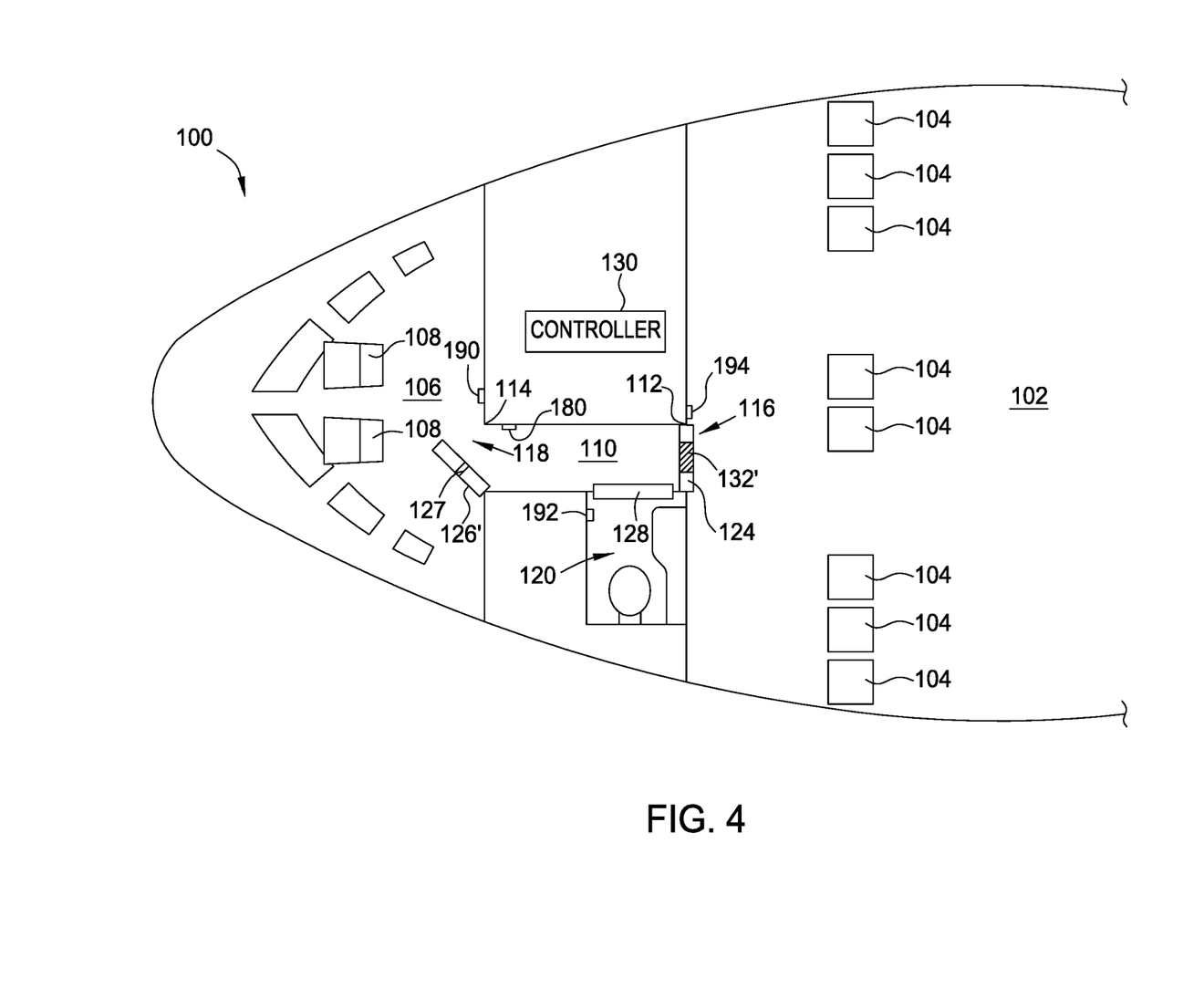
FIG. 4 is a top schematic view of the layout shown in FIG. 1, wherein the aisle door and the lavatory are closed, the flight deck door is open, and the window in the aisle door is in an opaque state.

For longer flights in which a flight crew member may leave the flight deck 106, the controller 130 controls operation of the electronic locks for the aisle door 124, the flight deck door 126, and the window 132 in a manner that maintains security. FIG. 4 illustrates a first step in an exemplary scenario in which a flight crew member uses a flight crew facility 120 (e.g., a lavatory). The flight crew member that is leaving the flight deck 106 signals the controller 130 to unlock the flight deck door 126. For example, the flight deck 106 may include a button, switch, icon on a touchscreen, or other lock release 190 that the flight crew member can operate to signal the controller 130 to unlock the flight deck door 126. Upon receiving the signal, the controller 130 checks to ensure that the aisle door 124 is in the closed position and the locked state. The controller 130 also switches the (optional) window 132 from the transparent state to the opaque state (indicated by cross-hatching and by reference numeral 132'). If the aisle door 124 is not in the closed position and the locked state and/or if the (optional) window 132 is not in the opaque state, then the controller 130 does not unlock the flight deck door 126. In the event the controller 130 does not unlock the flight deck door 126, the controller 130 may transmit a message to the flight deck 106 (e.g., to the EICAS display on the flight deck 106), indicating the reason why the flight deck door 126 was not unlocked. After the controller 130 unlocks the flight deck door 126, the flight crew member can move the flight deck door 126 to the open position 126'.

Figure 5:
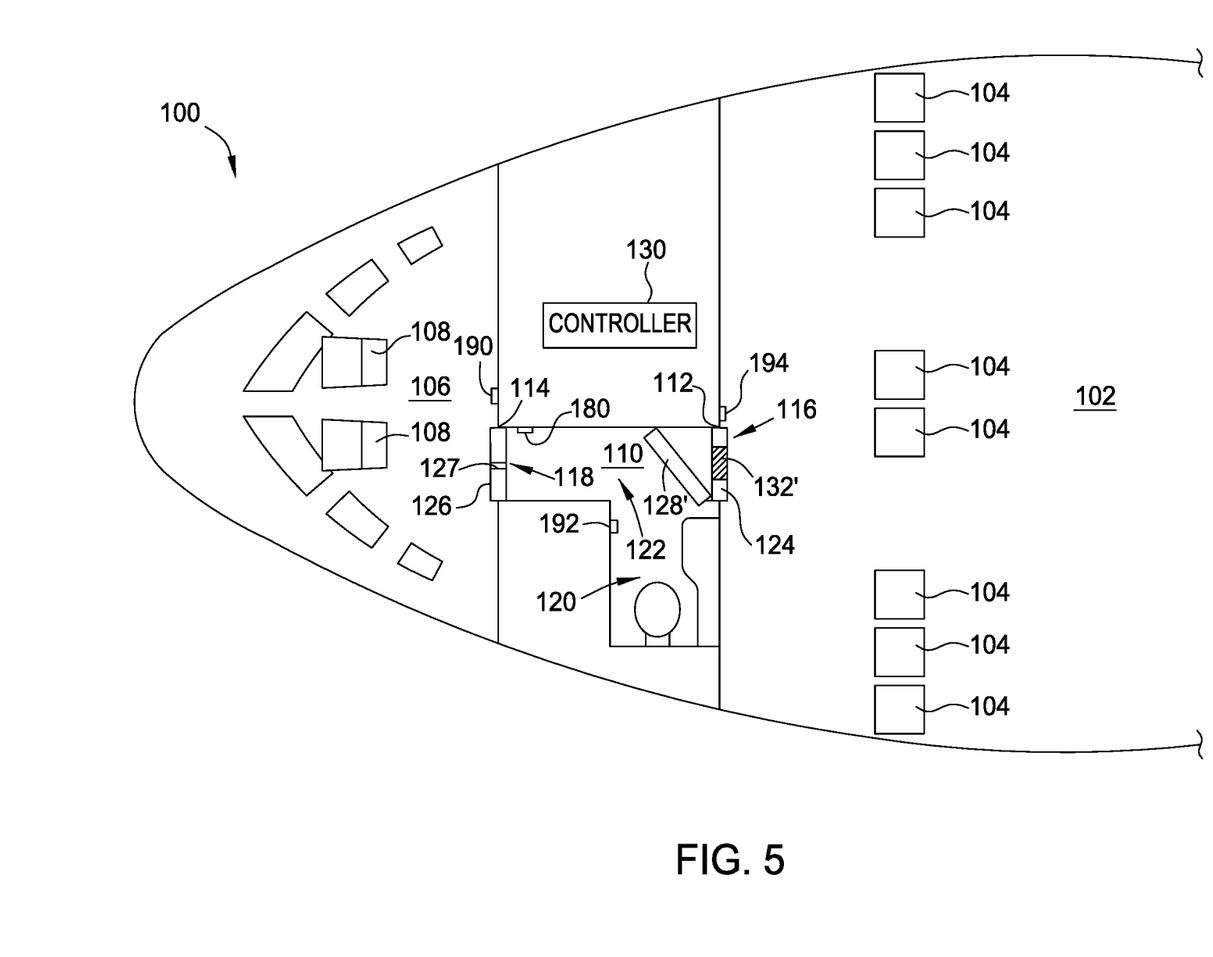
FIG. 5 is a top schematic view of the layout shown in FIG. 1, wherein the aisle door and the flight deck door are closed and the door to the lavatory is open, and wherein the window in the aisle door is in the opaque state.

In FIG. 5, the flight crew member has moved from the flight deck 106 to the aisle 110 and has closed the flight deck door 126. Once the flight deck door 126 has been closed, the controller 130 signals the electronic lock associated with the flight deck door 126 to re-lock the flight deck door 126. The flight crew member moves the flight crew facility door 128' to the open position to enter the flight crew facility 120. There may be a delay between the flight crew member closing the flight deck door 126 and opening the flight crew facility door 128'. To avoid the flight crew member in the aisle 110 being visible to the passenger cabin 102, the controller 130 may maintain the window 132' in the opaque state for a minimum duration of time after the flight deck door 126 is returned to the closed position and the locked state. In at least one aspect, a motion sensor or other sensor that can detect the presence of a person is disposed in the aisle 110. The controller 130 maintains the window 132' in the opaque state at times when the sensor detects the presence of a person in the aisle 110.

Figure 6:
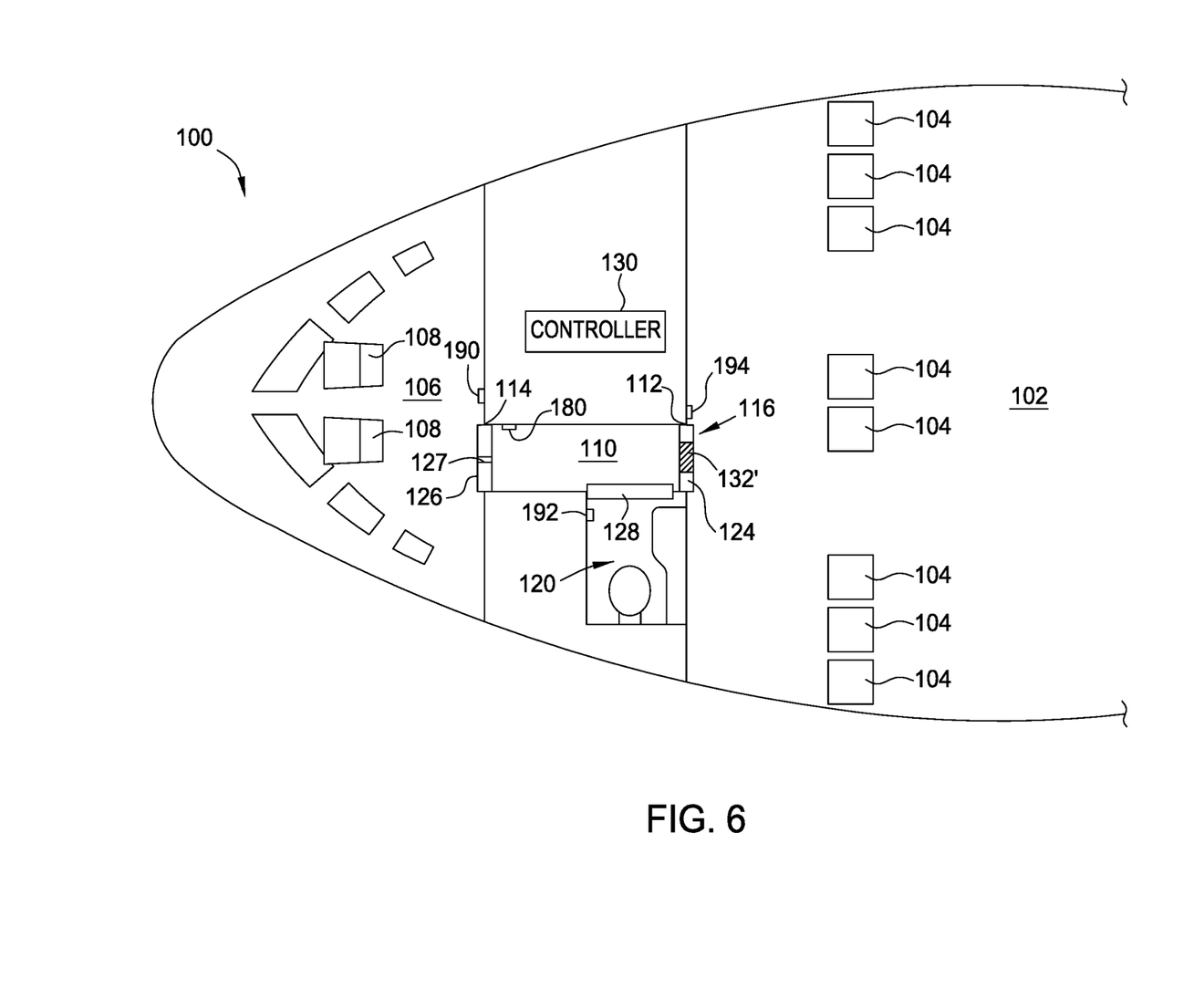
FIG. 6 is a top schematic view of the layout shown in FIG. 1, where the aisle door, the flight deck door, and the door to the lavatory are closed, and wherein the window in the aisle door is in the opaque state.

Referring to FIG. 6, after the flight crew member enters the flight crew facility 120, the flight crew member closes the flight crew facility door 128 and locks the flight crew facility door 128. As discussed above, the flight crew member may manually actuate a locking mechanism or may use a user interface 192 to signal the controller 130 to lock the flight crew facility door 128. While the flight crew facility door 128 is in the locked state, the controller 130 maintains the window 132' in the opaque state. Referring again to FIG. 5, when the flight crew member is finished in the flight crew facility 120, the flight crew member unlocks the flight crew facility door 128 and opens the flight crew facility door 128'. As discussed above, the controller 130 may keep the window 132' in the opaque state for a minimum duration of time after the flight crew facility door 128 is unlocked.

Referring again to FIG. 6, after the flight crew member has exited from the flight crew facility 120 and returned to the aisle 110, the flight crew member requests reentry to the flight deck 106. In one aspect, the flight crew member in the aisle 110 may simply knock on the flight deck door 126, and a flight crew member remaining on the flight deck 106 may visually confirm the identification of the flight crew member in the aisle 110 via the peephole 127 in the flight deck door 126. Referring again to FIG. 4, thereafter, the flight crew member remaining on the flight deck 106 may unlock the flight deck door 126 such that the flight deck door 126 can be opened and the flight crew member in the aisle 110 may enter the flight deck 106. In another aspect, a user interface 180 may be included in the aisle 110, and the flight crew member in the aisle 110 can unlock the flight deck door 126 using the user interface 180. The user interface 180 is operable to receive identification indications from the respective flight crew members, and the controller unlocks the flight deck door 126 upon the user interface 180 receiving a valid identification indication. For example, the user interface 180 could be a numerical and/or alphabetical keypad, and the various flight crew members may have unique numerical and/or alphabetical phrases. The user interface 180 transmits entered numerical and/or alphabetical phrases to the controller 130, which compares the entered phrases to a stored database of phrases for flight crew members. In the event the transmitted numerical and/or alphabetical phrase matches a stored phrase, then the controller 130 unlocks the flight deck door 126. In various other aspects, the user interface 180 could be a fingerprint scanner (wherein the identification indication is a scanned fingerprint), a retina scanner (wherein the identification indication is a scanned retina image), a radio frequency identification (RFID) scanner that reads an RFID chip in an employee badge (wherein the identification indication is a unique identifier associated RFID), a barcode reader that reads a barcode on an employee badge (wherein the identification indication is a unique identifier associated with the barcode), or a magnetic stripe reader that reads a magnetic stripe on an employee badge (wherein the identification indication is a scanned fingerprint). In various other aspects, the user interface 180 could be a digital camera that captures an image of the crew member's face. In such aspects, the identification indication could be a facial image of the crew member or geometric features of the crew member's face (e.g., distance between eye pupils and/or relative positions of facial features, such as the nose, cheek bones, eyes, and ears). In at least one aspect, the user interface 180 interacts with a token that is stored on the flight deck 106. The token could include an RFID chip, magnetic stripe, or other identifier that is unique to the aircraft and readable by the user interface 180. In the event a flight crew member leaves the flight deck (e.g., to use the lavatory 120), the flight crew member would take the token. Upon returning to the flight deck 106, the flight crew member would use the token with the user interface 180 such that the user interface 180 reads the identifier of the token. After the user interface 180 reads the token, the controller 130 unlocks the flight deck door 126 such that the flight crew member can re-enter the flight deck 106. After re-entering the flight deck 106, the flight crew member returns the token to its stored location on the flight deck 106.

After the flight crew member reenters the flight deck and closes the flight deck door 126, the controller 130 transmits a signal to the electronic lock for the flight deck door 126 such that the flight deck door 126 returns to the locked state. Thereafter, the controller 130 transmits a signal to the window 132 to return the window to the transparent state. At this point, the controller 130 has returned the doors to the "nominal" stage illustrated in FIG. 3.

As discussed above, in certain aspects, the window 132 may change from a transparent state to an opaque state to mask the movements of flight crew members in the flight crew facility 120, the aisle 110, on the flight deck 106. However, the transition from the transparent state to the opaque state may be an indication to passengers in the passenger cabin 102 that a flight crew member is moving between the flight deck 106, the aisle 110, and/or the flight crew facility 120. To avoid sending such an inadvertent indication to passengers, the controller 130 may randomly switch the window 132 from the transparent state to the opaque state at various times when the flight crew members are not moving from the flight deck (i.e., when the flight deck door 126 is locked). Additionally, the controller 130 may switch the window 132 from the transparent state to the opaque state for a random period of time (i.e., a random interval of time) before unlocking the flight deck door 126. For example, if the flight crew member signals the controller 130 to unlock the flight deck door 126, the controller 130 may change the window from the transparent state to the opaque state and then wait a randomly-determined duration of time before unlocking the flight deck door 126.

In addition to a flight crew member leaving the flight deck 106 during longer flights, it may be necessary for a flight attendant or other crew member to access the flight deck 106 from the passenger cabin during such longer flights. For example, a flight attendant may bring a meal and/or a beverage to the flight crew members. As another example, a relief flight crew member (e.g., a relief pilot) may rest in a passenger seat 104 in the passenger cabin 102, and the relief flight crew member going on duty will pass through the aisle 110 to enter the flight deck 106 to take over for a flight crew member going off-duty. The process for a flight attendant or other flight crew member accessing the flight deck 106 from the passenger cabin 102 begins with reference to FIG. 3. As discussed above, in the "nominal" stage illustrated in FIG. 3, the aisle door 124 and the flight deck door 126 are in the closed positions and locked states, and the window 132 is in the transparent state. The flight attendant or crew member needing access to the flight deck 106 may operate a user interface 194 (e.g., press a call button) in the passenger cabin 102. In response to the operation of the user interface 194, the controller 130 may notify the flight crew members on the flight deck 106 of the request for access. For example, the controller 130 could display a message on the EICAS display. A flight crew member can confirm the identity of the flight attendant or other crew member in the passenger cabin 102 by viewing the flight attendant or other crew member through the peephole 127 and the window 132 (in the transparent state).

Figure 3:
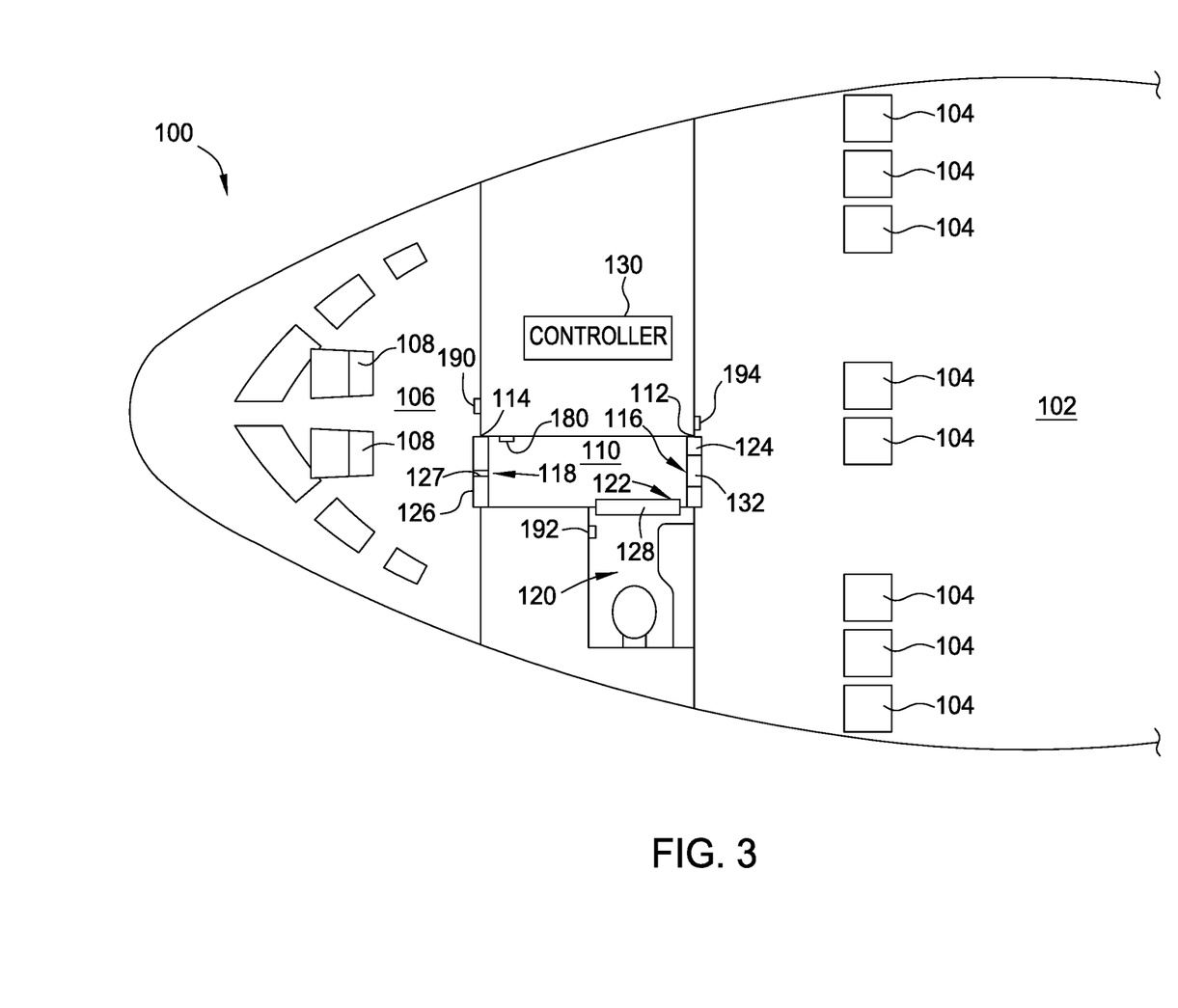
FIG. 3 is a top schematic view of the layout shown in FIG. 1, wherein the aisle door, flight deck door, and lavatory door and closed, and a window in the aisle door is in a transparent state.

After confirming the identity of the flight attendant or other crew member, the flight crew member on the flight deck 106 can unlock the aisle door 124 using the lock release 190. As discussed above, the lock release 190 may be a button, switch, or icon on a touch screen display, for example. After the aisle door 124 is unlocked, the flight attendant or other crew member can open the aisle door 124', as shown in FIG. 1. After the flight attendant or other crew member passes through the open aisle door 124', the flight attendant or other crew member closes the aisle door 124. After the aisle door 124 is closed, the controller 130 changes the window 132 from the transparent state (as shown in FIG. 3) to the opaque state 132' (as shown in FIG. 6). Thereafter, the flight crew member on the flight deck 106 unlocks the flight deck door 126' (as shown in FIG. 4) to allow the flight attendant or other crew member to enter the flight deck 106. Alternatively, once the flight attendant or other crew member is in the aisle 110, the flight attendant or other crew member could use the user interface 180 to provide a valid identification indication to unlock the flight deck door 126.

After the flight attendant or other crew member has completed their tasks on the flight deck 106, the above-described process can be reversed. In certain circumstances, such as if the flight attendant or other crew member is delivering a cup of coffee, the flight deck door 126' may not be closed and locked during the short duration of the flight attendant's or other crew member's presence on the flight deck 106. In such circumstances, the flight attendant or other crew member would leave the flight deck 106 and enter the aisle 110, closing the flight deck door 126. Once the flight deck door 126 is closed, the controller 130 locks the flight deck door 126 (as shown in FIG. 6). In other circumstances in which the flight attendant or other crew member will be on the flight deck 106 for a longer period of time (e.g., delivering food and/or cleaning up discarded or used trays of food), the flight deck door 126 may be closed and locked by the controller 130 while the flight attendant or other crew member is on the flight deck 106. In such circumstances, the flight attendant or other crew member would view the aisle 110 through the peephole 127 to ensure that the aisle 110 is clear. Thereafter, the flight attendant or other crew member (or a flight crew member on the flight deck 106) would use the lock release 190 on the flight deck 106 to send an unlock command to the controller 130 to unlock the flight deck door 126 such that the flight attendants or other crew member can open the flight deck door 126 (as shown in FIG. 4). Thereafter, the flight attendant or other crew member would leave the flight deck 106 and enter the aisle 110, closing the flight deck door 126.

After the flight deck door 126 is closed and locked (by the controller 130), the controller 130 can unlock the aisle door 124 so that the flight attendant or other crew member can leave the aisle 110 and return to the passenger cabin 102. For example, a flight crew member on the flight deck 106 may use the lock release 190 transmit an unlock command to the controller 130 to unlock the aisle door 124. Upon receiving a request to unlock the aisle door 124, the controller 130 may first switch the window 132' from the opaque state (as shown in FIG. 6) to the transparent state (as shown in FIG. 3) so that the flight crew member on the flight deck 106 can view the passenger cabin 102 through the peephole 127 and the transparent window 132. After confirming that the passenger cabin 102 proximate to the aisle door 124 is clear, the flight crew member on the flight deck 106 further transmits an unlock command to the controller 130 (e.g., using the lock release 190) to unlock the aisle door 124 such that the flight attendant or other crew member can open the aisle door 124' (as shown in FIG. 1) to leave the aisle 110 and return to the passenger cabin 102. Thereafter, the flight attendant or other crew member closes the aisle door 124 and the controller 130 locks the aisle door 124 (as shown in FIG. 3), returning the doors to the "nominal" stage.

Figure 7:
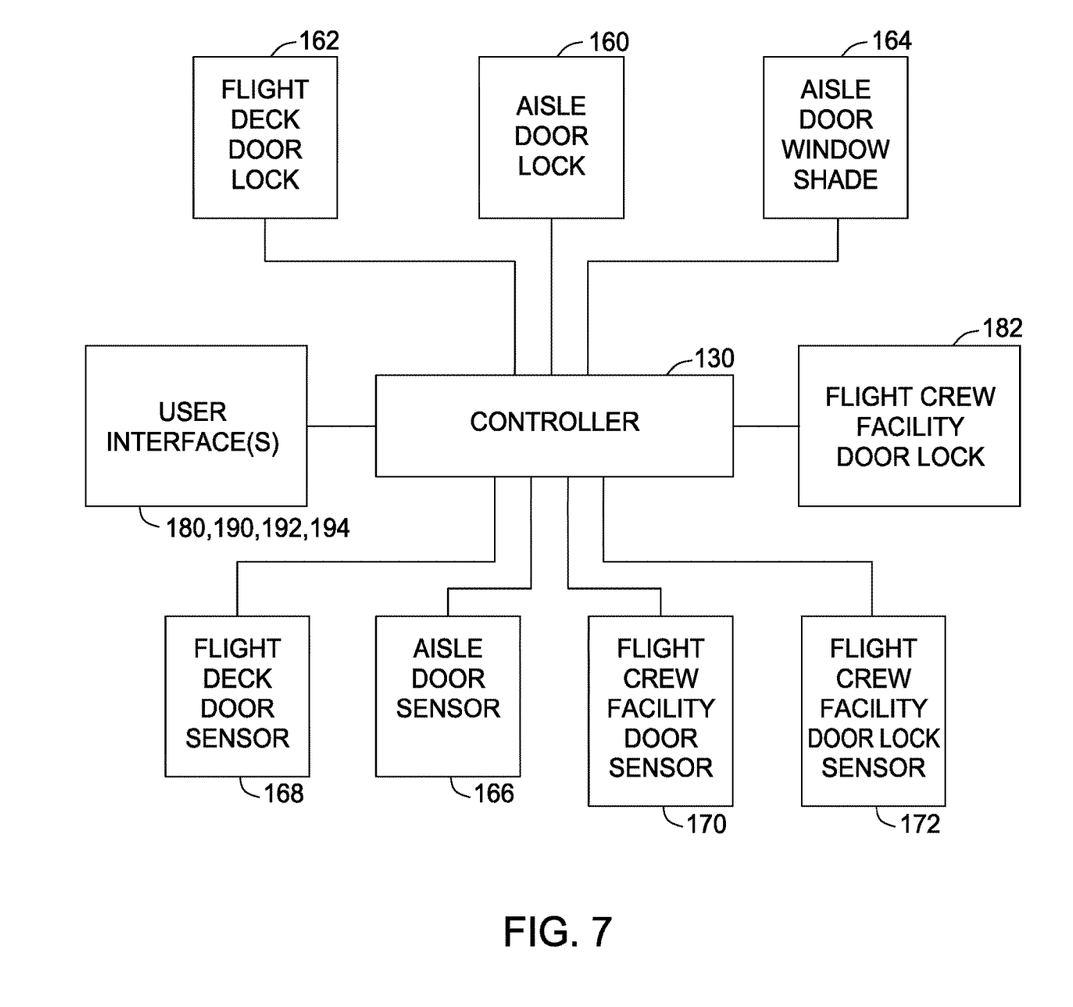
FIG. 7 is a block diagram of a control arrangement for controlling operation of multiple doors that provide access to a flight deck of an aircraft.

FIG. 7 is a block diagram for a system controlled by the controller 130 to perform the above-described sequences for unlocking/locking the aisle door 124, the flight deck door 126, and the flight crew facility door 128. The controller 130 is in communication with an aisle door lock 160 (i.e., a first electronically-actuated lock) and a flight deck door lock 162 (i.e., a second electronically-actuated lock). In one aspect, the aisle door lock 160 and the flight deck door lock 162 may be solenoid-driven deadbolts disposed in the respective first and second doorways 116 and 118. The controller 130 could energize or de-energize the solenoids to engage or disengage the deadbolts from the aisle door 124 and the flight deck door 126, respectively. The controller 130 is also in communication with an aisle door sensor 166 and a flight deck door sensor 168. The aisle door sensor 166 and the flight deck door sensor 168 may be proximity sensors or contact sensors that detect whether the aisle door 124 and the flight deck door 126, respectively, are in the closed position or in an open position. The controller 130 may be configured to automatically energize the solenoid for the aisle door lock 160 when the aisle door sensor 166 indicates that the aisle door 124 is in the closed position. Also, the controller 130 may be configured to automatically energize the solenoid for the flight deck door lock 162 when the flight deck door sensor 168 indicates that the flight deck door 126 is in the closed position.

As discussed above, in at least one aspect, the aisle door 124 includes a window 132 that may be shaded or made opaque. The controller 130 is in communication with the aisle door window shade 164 to selectively control whether the window is in a transparent state or an opaque state. As discussed above, the window 132 may be electronically dimmable, and the controller 130 could control whether the window is transparent (i.e., not dimmed) or opaque (dimmed). Alternatively, the window 132 may include a mechanical shade that is movable over the window 132, and the controller 130 can control movement of the mechanical shade over the window (opaque) or away from the window (transparent).

The controller 130 can also be in communication with a flight crew facility door sensor 170. Similar to the flight deck door sensor 168 and the aisle door sensor 166, the flight crew facility door sensor 170 may be a proximity sensor or a contact sensor that detect whether the flight crew facility door 128 is in the closed position or in an open position. The controller 130 is also in communication with a lock for the flight crew facility door 128 such that the controller 130 detects whether the flight crew facility door 128 is in a locked state or in unlocked state. As discussed above, in at least one aspect, the lock for the flight crew facility door 128 is manually actuated by a flight crew member, flight attendant, or other crew member in the flight crew facility 120. For example, the lock for the flight crew facility door 128 may be a manually slidable deadbolt. In such aspects, the controller 130 is in communication with a flight crew facility door lock sensor 172 that detects whether the manually-actuatable lock for the flight crew facility door 128 is in a locked state or in unlocked state. For example, the flight crew facility door lock sensor 172 may be a contact sensor or a proximity sensor that detects whether a deadbolts is engaged in a mating striker plate arranged in the third doorway 122. In at least one other aspect, the lock for the flight crew facility door 128 is controlled by the controller 130. For example, the lock for the flight crew facility door 128 may be a solenoid driven deadbolt disposed in the third doorway 122. The controller 130 could energize or de-energize the solenoid to engage or disengage the deadbolt from the flight crew facility door 128 in response to operation of the user interface 192 in the flight crew facility 120. In such an aspect, the controller 130 is in communication with the flight crew facility door lock 182, and the controller 130 can detect whether the flight crew facility door lock 182 is in a locked state or an unlocked state.

Figure 8:
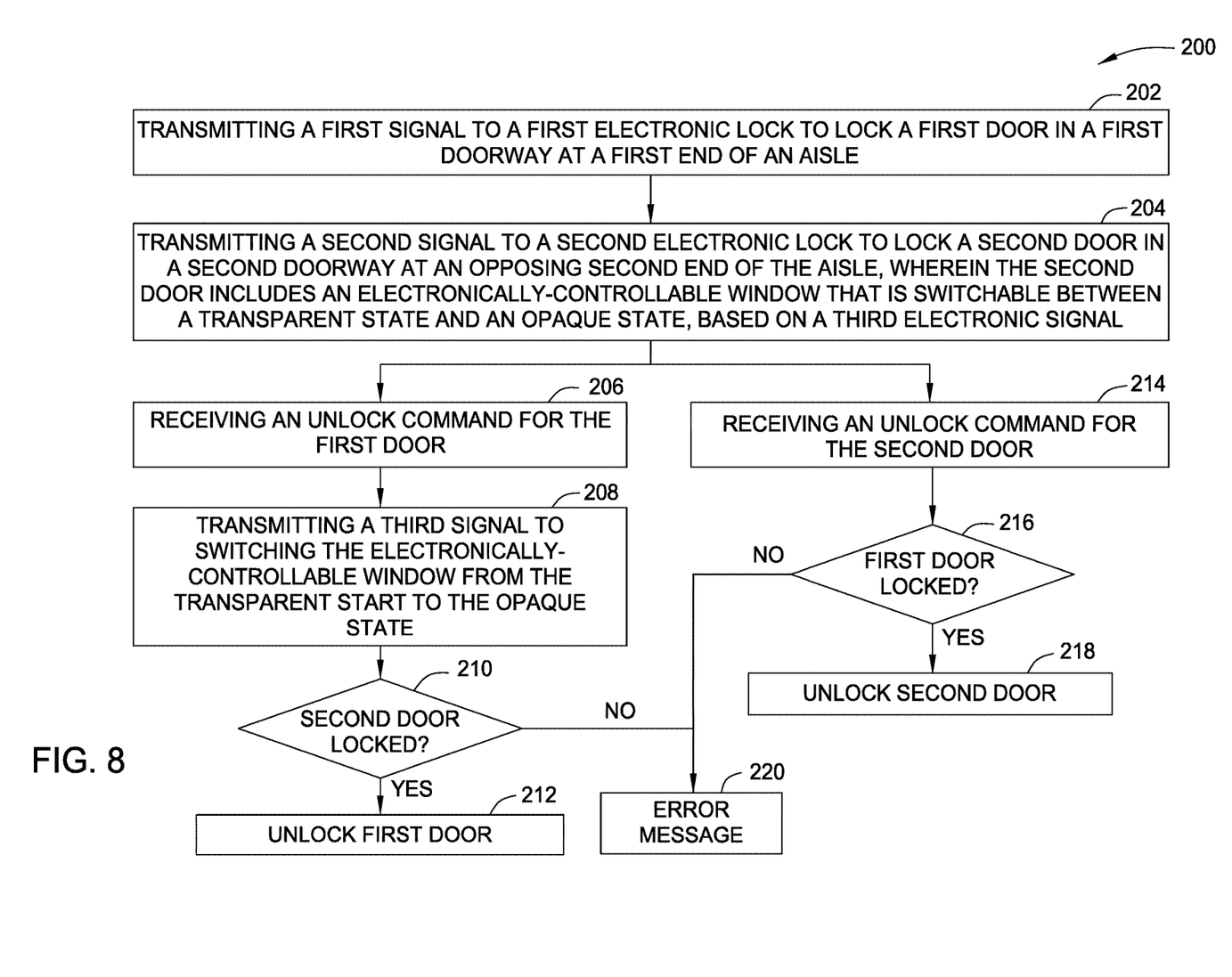
FIG. 8 is a flow chart of a method for operating multiple doors that provide access to a flight deck of an aircraft.

FIG. 8 is a flow chart for a method 200 for operating doors that provide access to a flight deck of a commercial aircraft. In block 202 of the method 200, a first signal is transmitted to a first electronic lock to lock a first door in a first doorway at a first end of an aisle. For example, with reference to FIGS. 1-6, the flight deck door 126, disposed adjacent to the flight deck 106, may be locked. In block 204 of the method, a second signal is transmitted to a second electronic lock to lock the second door. For example, the door 124 disposed adjacent to the passenger cabin 102 may be locked. The method 200 includes separate steps for unlocking the first door and for unlocking the second door. In block 206, a command to unlock the first door is received. In block 208, a third signal is transmitted to a window in the second door, wherein the third signal causes the window to switch from a transparent state to an opaque state. In block 210, a determination is made as to whether the second door is locked. If the second door is locked, then the first door is unlocked in block 212. Returning to block 210, if the second door is not locked, then the first door is not unlocked, and an error message is transmitted in block 220. For example, the error message may be displayed on the EICAS display screen, discussed above.

In block 214, a command to unlock the second door is received. In block 216, a determination is made as to whether the first door is locked. If the first door is locked, then the second door is unlocked in block 218. Returning to block 216, if the first door is not locked, then the second door is not unlocked, and an error message is transmitted in block 220.

In the above-described systems and methods, a security protocol is provided for a commercial aircraft that enables the flight crew to securely access the flight deck of the aircraft. For example, pilots can leave the flight deck to use the restroom or to switch places with other crew members in a secure manner. Additionally, such pilot movements can be accomplished without a flight attendant or other crew member being present to physically block access to the flight deck door from the passenger cabin.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. An aircraft, comprising:
   a passenger cabin;
   a flight deck;
   an aisle disposed between the passenger cabin and the flight deck, wherein the aisle includes a first doorway connected to the passenger cabin at a first end and a second doorway connected to the flight deck at an opposing second end;
   a flight crew facility disposed between the first end and the second end of the aisle, wherein the flight crew facility includes a third doorway connected to the aisle;
   a first door disposed in the first doorway, wherein the first door is movable between an open position and a closed position, wherein the first door is selectively switchable between an unlocked state and a locked state when the first door is in the closed position;
   a second door disposed in the second doorway, wherein the second door is movable between an open position and a closed position, wherein the second door is selectively switchable between an unlocked state and a locked state when the second door is in the closed position;
   a third door disposed in the third doorway, wherein the third door is movable between an open position and a closed position, wherein the third door is selectively switchable between an unlocked state and a locked state when the third door is in the closed position; and
   a controller operable to control switching of the first and second doors between the respective unlocked states and the locked states, wherein the controller switches a first one of the first and second doors from the locked state to the unlocked state, while the aircraft is operating, upon:
      receiving a request signal to unlock the one of the first and second doors, and
      a remaining one of the first and second doors being in the locked state.

2. The aircraft of claim 1, wherein the first door includes a window, wherein the window is switchable between a transparent state and an opaque state, and wherein the controller is further operable to switch the window to the opaque state when the second door is in the unlocked state.

3. The aircraft of claim 2, wherein the controller switches the window to the opaque state before switching the second door to the unlocked state and maintains the window in the opaque state for a period of time the after the second door is switched back to the locked state.

4. The aircraft of claim 3, wherein the period of time is a randomly selected period of time.

5. The aircraft of claim 3, wherein the controller maintains the window in the opaque state upon the third door being switched to the locked state.

6. The aircraft of claim 2, wherein the controller periodically and randomly switches the window to the opaque state for an interval of time when the second door is in the locked state.

7. The aircraft of claim 1, wherein the flight crew facility is one of a lavatory and a crew rest area.

8. The aircraft of claim 1, further comprising a user interface disposed in the aisle and in communication with the controller, wherein the user interface is operable to receive identification indications from crew members, and wherein the controller is further operable to switch the second door to the unlocked state upon:
   the user interface receiving a valid identification indication; and
   the first door being in the locked state.

9. The aircraft of claim 8, wherein the first door includes a window, wherein the window is switchable between a transparent state and an opaque state, wherein the controller is further operable to switch the window to the opaque state when the second door is in the unlocked state, and wherein the controller switches the window to the opaque state before switching the second door to the unlocked state.

10. The aircraft of claim 1, further comprising a lock release disposed on the flight deck and in communication with the controller, wherein the lock release is operable to receive an unlock command from crew members on the flight deck, and wherein the controller is further operable to open the second door upon:
   the lock release receiving an unlock command; and
   the first door being in the locked state.

11. The aircraft of claim 10, wherein the first door includes a window, wherein the window is switchable between a transparent state and an opaque state, wherein the controller is further operable to switch the window to the opaque state when the second door is in the unlocked state, and wherein the controller switches the window to the opaque state before switching the second door to the unlocked state.

12. The aircraft of claim 1, further comprising an indicator panel disposed in one of the flight deck and the passenger cabin, the indicator panel operable to indicate whether the first door and the second door are in the locked state or the unlocked state, respectively.

13. A system, comprising:
   a first electronically-actuated lock configured to be disposed relative to a first door in a first doorway at a first end of an aisle;
   a second electronically-actuated lock configured to be disposed relative to a second door in a second doorway at an opposing second end of the aisle;

an electronically-controllable window configured to be disposed in the second door that is switchable between a transparent state and an opaque state; and a controller in electronic communication with the first electronically-actuated lock, the second electronically-actuated lock, and the electronically-controllable window, the controller operable to:

transmit first signals to the first electronically-actuated lock, wherein the first signals switch the first electronically-actuated lock between a locked state and an unlocked state;

transmit second signals to the second electronically-actuated lock, wherein the second signals switch the second electronically-actuated lock between a locked state and an unlocked state; and transmit third signals to the electronically-controllable window, wherein the third signals switch the electronically-controllable window between the transparent state and the opaque state, wherein the controller transmits the first signals to switch the first electronically-actuated lock to the unlocked state upon:

determining that the second electronically-actuated lock is in the locked state; and transmitting the third signals to the electronically-controllable window to switch the electronically-controllable window to the opaque state; and wherein the controller transmits the second signals to switch the second electronically-actuated lock to the unlocked state upon determining that the first electronically-actuated lock is in the locked state.

14. The system of claim 13, further comprising:

a sensor configured to be disposed in a third doorway connected to the aisle, wherein the sensor is operable to detect whether the a third door in the third doorway is in a closed state or an open state, wherein the controller is operable to transmit the third signals to the electronically-controllable window to switch the electronically-controllable window to the opaque state if the sensor detects that the third door is in the open state.

15. The system of claim 13, wherein the controller is operable to randomly transmit the third signals to the electronically-controllable window to switch the electronically-controllable window to the opaque state when then first electronically-actuated lock is in the locked state.

16. The system of claim 13, further comprising a user interface configured to be disposed in the aisle, wherein the user interface is operable to receive identification indications from crew members, and wherein the controller is further operable to transmit the first signals to unlock the first door upon:

the user interface receiving a valid identification indication; and the first door being in the locked state.

17. A computer-implemented method, comprising:

transmitting a first signal to a first electronic lock to lock a first door in a first doorway at a first end of an aisle;

transmitting a second signal to a second electronic lock to lock a second door in a second doorway at an opposing second end of the aisle, wherein the second door includes an electronically-controllable window that is switchable between a transparent state and an opaque state, based on a third signal;

unlocking the first door upon:

receiving an unlock command;

transmitting the third signal to switch the electronically-controllable window from the transparent state to the opaque state; and receiving an indication that the second door is locked; and unlocking the second door upon receiving a second unlock command and upon receiving an indication that the first door is locked.

18. The computer-implemented method of claim 17, further comprising:

sensing whether a third door in a third doorway is in a closed state or an open state; and transmitting the third signal to switch the electrically-controllable window to the opaque state if the third door is in the open state.

19. The computer-implemented method of claim 17, further comprising randomly transmitting the third signals to the electronically-controllable window to switch the electronically-controllable window to the opaque state when then first electronically-actuated lock is in the locked state.

20. The computer-implemented method of claim 17, receiving an identification indication from a crew member; and transmitting the first signal to unlock the first door upon:

receiving a valid identification indication; and the second door being locked.

* * * * *